US011537743B2

United States Patent
Hidaka

(10) Patent No.: US 11,537,743 B2
(45) Date of Patent: Dec. 27, 2022

(54) EQUIPMENT MANAGEMENT SYSTEM AND EQUIPMENT MANAGEMENT METHOD

(71) Applicant: KYOCERA Corporation, Kyoto (JP)

(72) Inventor: Hiroyuki Hidaka, Kawasaki (JP)

(73) Assignee: KYOCERA CORPORATION, Kyoto (JP)

( * ) Notice: Subject to any disclaimer, the term of this patent is extended or adjusted under 35 U.S.C. 154(b) by 343 days.

(21) Appl. No.: 16/651,347

(22) PCT Filed: Sep. 25, 2018

(86) PCT No.: PCT/JP2018/035373
§ 371 (c)(1),
(2) Date: Mar. 27, 2020

(87) PCT Pub. No.: WO2019/065599
PCT Pub. Date: Apr. 4, 2019

(65) Prior Publication Data
US 2020/0265160 A1    Aug. 20, 2020

(30) Foreign Application Priority Data
Sep. 28, 2017   (JP) .............................. JP2017-187647

(51) Int. Cl.
G06F 21/62     (2013.01)
G06F 16/23     (2019.01)
(52) U.S. Cl.
CPC ...... *G06F 21/6245* (2013.01); *G06F 16/2379* (2019.01)

(58) Field of Classification Search
None
See application file for complete search history.

(56) References Cited

U.S. PATENT DOCUMENTS

| | | | |
|---|---|---|---|
| 2002/0059320 A1 | 5/2002 | Tamaru | |
| 2003/0167150 A1* | 9/2003 | Shimura | ................ G06Q 10/10 702/182 |
| 2005/0133743 A1* | 6/2005 | Schets | ................. G03F 7/70633 250/559.3 |
| 2011/0087377 A1 | 4/2011 | Nabeshima et al. | |
| 2012/0084359 A1* | 4/2012 | Mizutani | ............ H04L 67/2842 709/204 |
| 2014/0218169 A1 | 8/2014 | Chih et al. | |
| 2015/0026285 A1 | 1/2015 | Stabenow et al. | |

(Continued)

FOREIGN PATENT DOCUMENTS

| | | |
|---|---|---|
| JP | 2002-188183 A | 7/2002 |
| JP | 2005-182399 A | 7/2005 |

(Continued)

*Primary Examiner* — Kristine L Kincaid
*Assistant Examiner* — Felicia Farrow
(74) *Attorney, Agent, or Firm* — Hauptman Ham, LLP

(57) ABSTRACT

An equipment management system comprises a first database configured to store equipment information about an equipment, a second database configured to store user information about a user, and a controller configured to collect the equipment information from a control apparatus controlling the equipment. The controller is configured to allow access to the first database from the control apparatus. The controller is configured to prohibit access to the second database from the control apparatus.

5 Claims, 4 Drawing Sheets

(56) References Cited

U.S. PATENT DOCUMENTS

| | | | |
|---|---|---|---|
| 2015/0120008 A1* | 4/2015 | Hashimoto | G06Q 10/06 700/1 |
| 2018/0074469 A1 | 3/2018 | Ishizaka | |
| 2019/0007204 A1* | 1/2019 | Field | H04L 9/3226 |
| 2019/0086114 A1 | 3/2019 | Nakashima et al. | |
| 2019/0203969 A1* | 7/2019 | Kanamaru | F24F 11/30 |

FOREIGN PATENT DOCUMENTS

| | | | |
|---|---|---|---|
| JP | 2011227811 A | | 11/2011 |
| JP | 2012-123500 A | | 6/2012 |
| JP | 2015011659 A | * | 1/2015 |

* cited by examiner

FIG. 3

| INDEX INFORMATION | EQUIPMENT NAME | SENSING DATA | ERROR CODE | STATISTICAL DATA | REFERENCE DATA | OPERATION HISTORY |
|---|---|---|---|---|---|---|
|  |  |  |  |  |  |  |
|  |  |  |  |  |  |  |
|  |  |  |  |  |  |  |
| ... | ... | ... | ... | ... | ... | ... |

FIG. 4

| INDEX INFORMATION | FULL NAME OR NAME OF USER | USER ADDRESS | EMAIL ADDRESS | TELEPHONE NUMBER | CONTRACTOR INFORMATION | MAINTENANCE INFORMATION |
|---|---|---|---|---|---|---|
|  |  |  |  |  |  |  |
|  |  |  |  |  |  |  |
|  |  |  |  |  |  |  |
| ... | ... | ... | ... | ... | ... | ... |

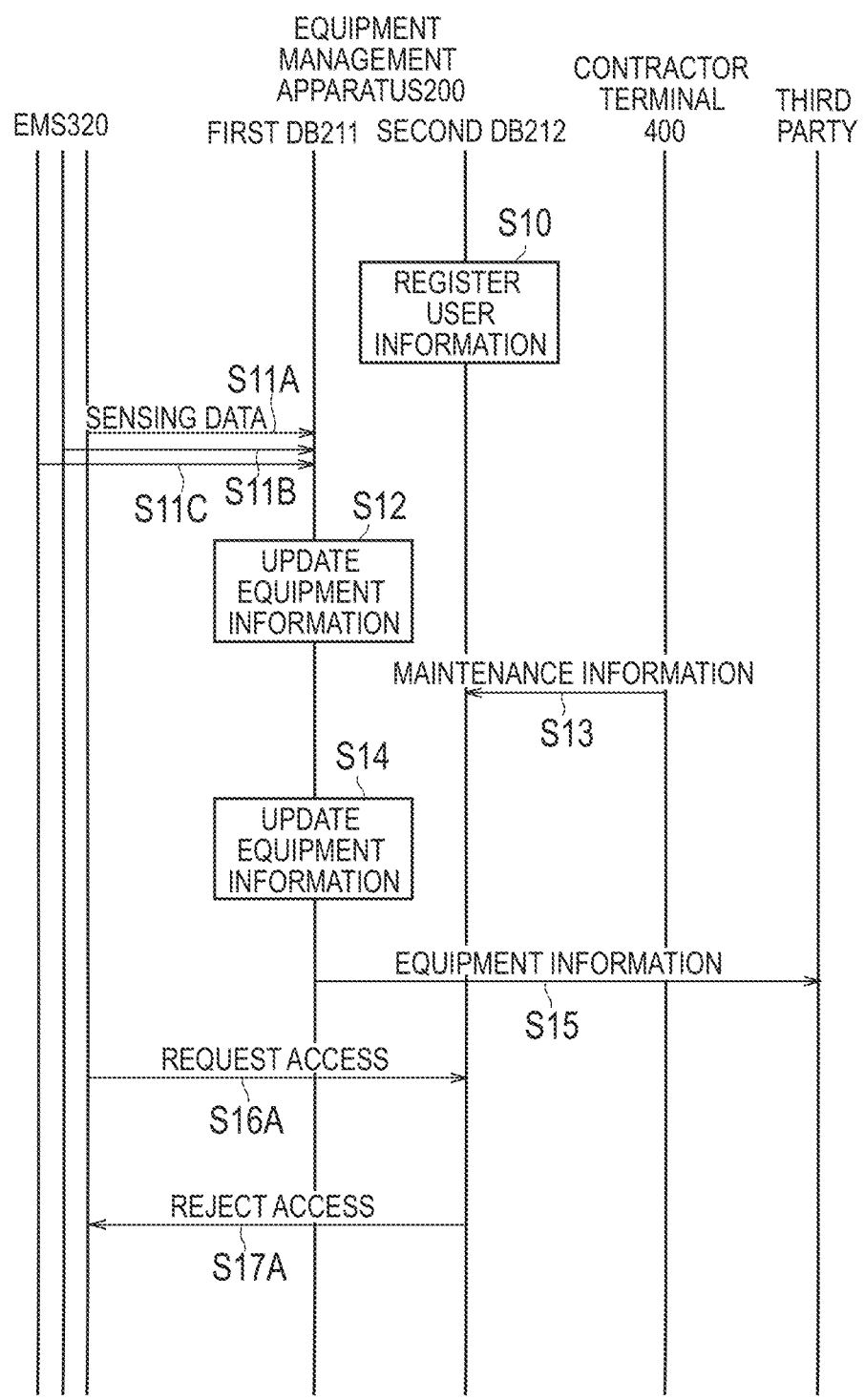

EQUIPMENT MANAGEMENT SYSTEM AND EQUIPMENT MANAGEMENT METHOD

RELATED APPLICATIONS

The present application is a National Phase of International Application No. PCT/JP2018/035373, filed Sep. 25, 2018, and claims priority based on Japanese Patent Application No. 2017-187647, filed Sep. 28, 2017.

TECHNICAL FIELD

The present invention relates to an equipment management system and an equipment management method.

BACKGROUND ART

An equipment management system which manages various information about a plurality of equipment is known. Examples of the various information include basic information and maintenance information about the equipment. For example, the basic information includes: installation date, predetermined durable years, and rated power consumption. The maintenance information includes maintenance histories of the equipment (for example, Patent literature 1).

CITATION LIST

Patent Literature

Patent Literature 1: Japanese application publication No. 2005-182399

SUMMARY OF INVENTION

Technical Problem

The information managed by the equipment management system includes user information on the user of the equipment. For example, the user information includes the full name or title of user, the user's address, and the user's contact information (such as an email address or telephone number).

Against this background, from the viewpoint of protection of user information, it is not preferable to arbitrarily allow access to user information.

Therefore, the present invention has been made to solve the above-described problems, and an object of the present invention is to provide an equipment management system and an equipment management method that can appropriately protect user information.

Solution to Problem

An equipment management system according to a first feature comprises a first database configured to store equipment information about an equipment, a second database configured to store user information about a user, and a controller configured to collect the equipment information from a control apparatus controlling the equipment. The controller is configured to allow access to the first database from the control apparatus. The controller is configured to prohibit access to the second database from the control apparatus.

An equipment management method according to a second feature comprises a step A of storing, in a first database, equipment information about an equipment, a step B of storing, in a second database, user information about a user, a step C of collecting the equipment information from a control apparatus controlling the equipment, a step D of allowing access to the first database from the control apparatus, and a step E of prohibiting access to the second database from the control apparatus.

Advantageous Effects of Invention

According to an aspect, it is possible to provide an equipment management system and an equipment management method that can appropriately protect user information.

BRIEF DESCRIPTION OF DRAWINGS

FIG. 3 is a diagram illustrating an example of information stored in a first DB 211 according to an embodiment.

FIG. 4 is a diagram illustrating an example of information stored in a second DB 212 according to an embodiment.

FIG. 5 is a diagram illustrating an equipment management method according to an embodiment.

DESCRIPTION OF EMBODIMENTS

Hereinafter, an embodiment will be described with reference to drawings. In the following description of drawings, the same or similar parts are denoted by the same or similar symbols.

However, it should be noted that the drawings are schematic and that dimensional ratios, etc. thereof are different from real ones. Therefore, specific dimensions, etc. should be determined in consideration of the following description. As a matter of course, the drawings include the parts at which mutual dimensional relations or ratios are different from one another.

Embodiment (Equipment Management System)

Figure 1:
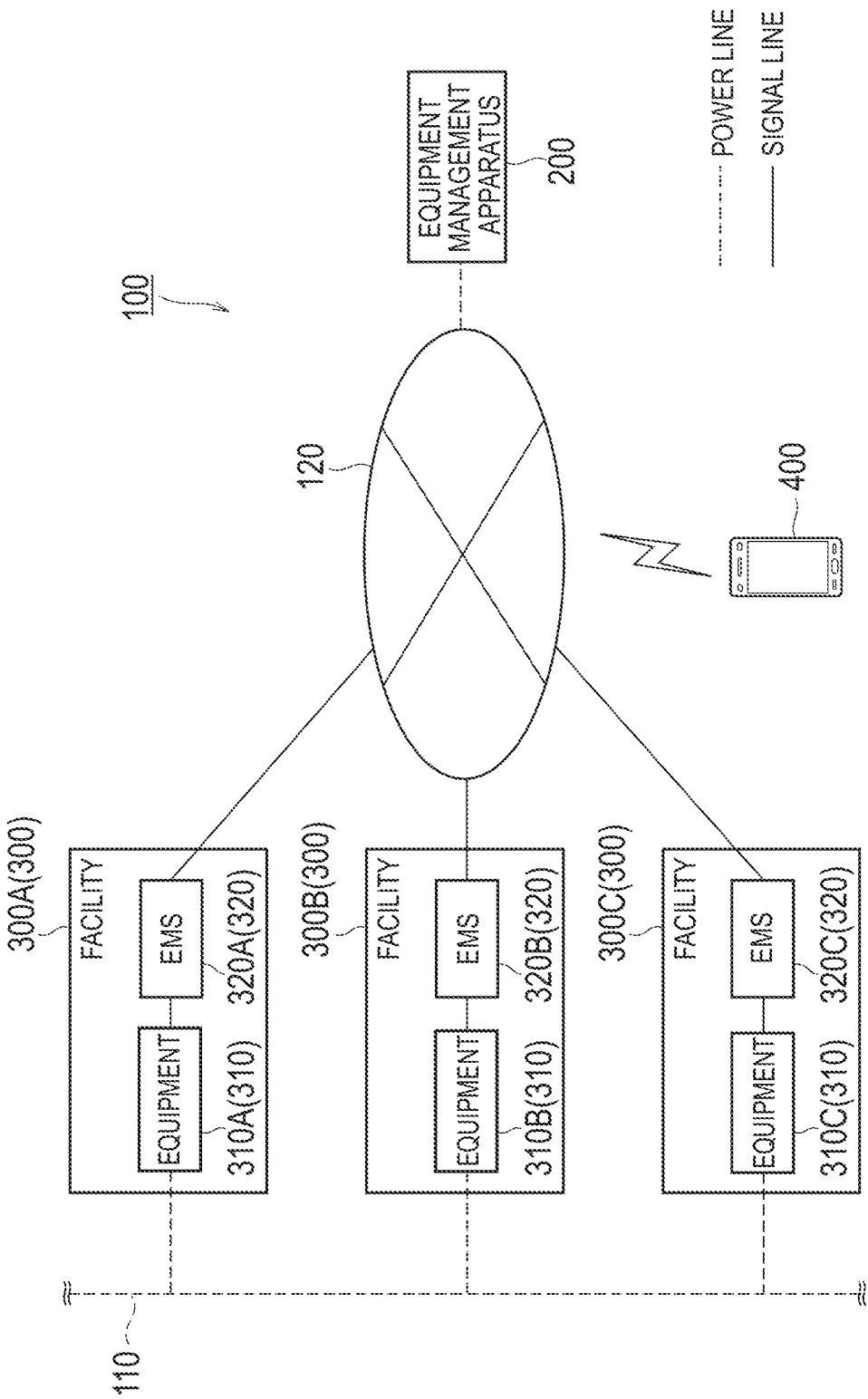
FIG. 1 is a diagram illustrating an equipment management system 100 according to an embodiment.

Hereinafter, an equipment management system according to the embodiment will be described. As illustrated in FIG. 1, the equipment management system 100 has an equipment management apparatus 200, facilities 300, and a contractor terminal 400. In FIG. 1, as the facilities 300, a facility 300A to a facility 300C are shown as examples. The equipment management apparatus 200, the facilities 300, and the contractor terminal 400 are connected to a network 120. The network 120 is only required to provide lines between the equipment management apparatus 200 and the facilities 300, and a line between the equipment management apparatus 200 and the contractor terminal 400. For example, the network 120 is the Internet. The network 120 may provide a dedicated line such as a virtual private network (VPN).

The equipment management apparatus 200 manages equipment provided at the facilities 300. Details of the equipment management apparatus 200 will be described later (see FIG. 2).

The facility 300 has the equipment 310, and an energy management system (EMS) 320. The equipment 310 is connected to a power grid 110. The equipment 310 may be a power generation equipment. The power generation equipment may be an equipment which generates power by using natural energy such as solar light, wind power, or geothermal heat. The power generation equipment may be a fuel cell apparatus. The equipment 310 may be a storage battery apparatus. The equipment 310 may be a load equipment, which consumes power. The load equipment may be an air-conditioning equipment or a lighting equipment. The facility 300 may have the equipment 310 of two or more types.

The EMS 320 is an apparatus (EMS: Energy Management System), which manages power information indicating power in the facility 300. The power in the facility 300 is the power which flows in the facility 300, the power bought by the facility 300, or the power sold by the facility 300.

The contractor terminal 400 may be a terminal which belongs to a contractor that carries out maintenance of the equipment 310. Examples of the maintenance include: a checkup of examining the deterioration state of the equipment, upkeep of carrying out simple services during the checkup, repair of fixing problems of the equipment to recover the originally installed state of the functions and performance of the equipment, and replacement of exchanging the existing equipment for a new equipment.

Herein, the equipment management system 100 may have a power management server. For example, the power management server transmits, to the facility 300, a power-flow control message which requests control of the amount of the power flow from the power grid 110 to the facility 300, a reverse-power-flow control message which requests control of the amount of the reverse power flow from the facility 300 to the power grid 110, a power-source control message which requests control of the equipment 310 (distributed power supply) provided in the facility 300, and so on.

(Equipment Management Apparatus)

Figure 2:
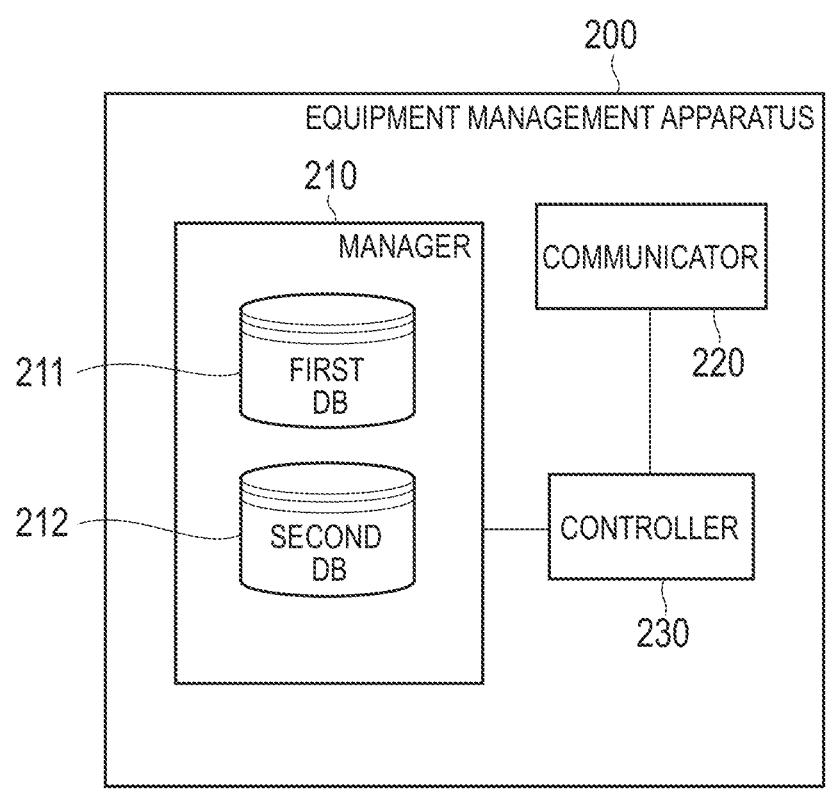
FIG. 2 is a diagram illustrating an equipment management apparatus 200 according to an embodiment.

Hereinafter, the equipment management apparatus according to the embodiment will be described. As illustrated in FIG. 2, the equipment management apparatus 200 has a manager 210, communicator 220, and a controller 230.

The manager 210 includes a storage medium (media) such as a non-volatile memory or/and a HDD and manages information about the plurality of facilities 300. The manager 210 has a first Database (DB) 211, and a second Database (DB) 212.

The first DB 211 stores equipment information about the equipment 310. For example, as illustrated in FIG. 3, the equipment information includes at least one of the equipment name, the sensing data, the error code, the statistical data, the reference data, and the operation history.

The equipment name is the name of the equipment 310. The equipment name may be information that uniquely identifies the equipment 310 (e.g., a maker code), or may be information indicating the type of the equipment 310 (for example, a solar cell apparatus, an air conditioner, or the like).

The sensing data is the data including numerical data representing the working state of the equipment 310. The sensing data is measured by a sensor provided at the facility 300. Alternatively, the sensing data may be measured by a sensor provided at the equipment 310 or may be measured by a sensor provided at the EMS 320. The sensing data is transmitted from the EMS 320 to the equipment management apparatus 200. For example, the sensing data may be output power data of the equipment 310, power consumption data of the equipment 310, temperature data of the equipment 310, environmental temperature data of the equipment 310, environmental humidity data of the equipment 310, or the like.

The error code is a code which identifies an error of the equipment 310. The error may be detected by the equipment 310 or may be detected by the EMS 320. The error code is transmitted from the EMS 320 to the equipment management apparatus 200. For example, the error code may be a code indicating an abnormality in the temperature of the equipment 310, a code indicating an abnormality in a part provided in the equipment 310, a code indicating an abnormality in output power of the equipment 310, a code indicating an abnormality in power consumption of the equipment 310.

The statistical data is the data obtained by statistical processing of numerical data. The statistical data may be generated by the equipment management apparatus 200. Alternatively, the statistical data may be generated by the equipment 310 or may be generated by the EMS 320. For example, the statistical data may be numerical data grouped or sorted for a particular purpose. The statistical data may be, for example, the data indicating the transition (profile) of output power of the equipment 310 in a predetermined period (for example, 1 day, 1 week, or 1 month) or the data indicating the transition of power consumption of the equipment 310 in a predetermined period.

The reference data is the data including a threshold value compared with the numerical data. The reference data is a value set by a manufacturer or the like of the equipment 310. The threshold value is a value used for determining the error of the equipment 310.

The operation history is the history about drive of the equipment 310. The operation history may be transitions of a drive mode in a predetermined period (for example, 1 day, 1 week, or 1 month), may be the number of times of execution of a predetermined drive mode, or may be the number of times driving of the equipment 310 stopped. For example, if the equipment 310 is a fuel cell apparatus, the operation history may be the number of times of normal stoppages of the fuel cell apparatus or may be the number of times of emergency stoppages of the fuel cell apparatus. If the equipment 310 is a storage battery apparatus, the operation history may be the number of times of charges of the storage battery apparatus, may be the charge time of the storage battery apparatus, may be the number of times of discharges of the storage battery apparatus, may be the discharge time of the storage battery apparatus, or may be the number of charge/discharge cycles of the storage battery apparatus.

In the embodiment, the first DB 211 may store index information which associates the equipment information, and the user information with one another as illustrated in FIG. 3. The index information includes a combination of arbitrary characters and numbers and is not required to have a meaning by itself.

The second DB 212 stores user information about users. The users may be legal persons or natural persons. For example, the user information includes at least one of the full names or names of the users, the addresses of the users, and contact information (mail addresses and phone numbers) of the users as illustrated in FIG. 4. The user information is the information to be protected. Furthermore, the user information may include at least one of contractor information and maintenance information as illustrated in FIG. 4.

The contractor information is the information about contractors which conduct transactions with users. The contractor may be a contractor which carries out maintenance. The contractor may be a manufacturer of the equipment 310. The contractor may be a company such as a power generation company, a company for power transmission and distribution, a retail company, or a resource aggregator.

The maintenance information is the information about maintenance of the equipment 310. The maintenance information may be a maintenance history or may be a maintenance schedule. The maintenance information may be accumulated by the maintenance information transmitted from the contractor terminal 400 or may be accumulated by the maintenance information input by an operator. The maintenance information may include the execution date of maintenance, the scheduled date of maintenance, and the contents of maintenance. As described above, the maintenance includes: for example, a checkup of examining the deterioration state of the equipment, upkeep of carrying out simple services during the checkup, repair of fixing problems of the equipment to recover the originally installed state of the functions and performance of the equipment, and replacement of exchanging the existing equipment for a new equipment.

In the embodiment, the second DB 212 may store index information which associates the equipment information, and the user information with one another as illustrated in FIG. 4. The index information includes a combination of arbitrary characters and numbers and is not required to have a meaning by itself.

The communicator 220 includes a communication module and communicates with the facilities 300 and the contractor terminal 400 via the network 120. For example, the communicator 220 receives the equipment information such as sensing data and error codes from the EMS 320. The communicator 220 receives the maintenance information from the contractor terminal 400.

The controller 230 includes, for example, a memory and a CPU and controls the configurations provided in the equipment management apparatus 200. In the embodiment, the controller 230 carries out the control shown below.

The controller 230 collects the equipment information from the EMS 320, which controls the equipment 310. The controller 230 may voluntarily collect the equipment information, which is transmitted from the EMS 320, or may collect the equipment information, which is transmitted from the EMS 320, in response to requests to the EMS 320. As described above, the equipment information is stored in the first DB 211.

The controller 230 allows the EMS 320 to access the first DB 211. On the other hand, the controller 230 prohibits the EMS 320 from accessing the second DB 212. In other words, the controller 230 is configured to prohibit the EMS 320 from accessing the second DB 212 even though the EMS 320 is allowed to access the first DB 211.

Similarly, the controller 230 may allow the contractor terminal 400 to access the first DB 211. On the other hand, the controller 230 may prohibit the contractor terminal 400 from accessing the second DB 212. In other words, the controller 230 may be configured to prohibit the contractor terminal 400 from accessing the second DB 212 even though the contractor terminal 400 is allowed to access the second DB 212.

The controller 230 may provide the equipment information to a third party. In such a case, the controller 230 deletes at least the index information. According to such a configuration, the risk that the user information might be leaked to the third party can be reduced. The third party is not particularly limited, but may be a company such as a power generation company, a company for power transmission and distribution, a retail company, or a resource aggregator.

(Equipment Managing Method)

Hereinafter, an equipment management method according to the embodiment will be described.

As illustrated in FIG. 5, in step S10, the user information is registered in the second DB 212. The registration is carried out based on a contract or the like between an organizer of the equipment management apparatus 200 and a user of the equipment 310. The registration is carried out by an operator of the equipment management apparatus 200.

In step S11 (S11A to S11C), each EMS 320 accesses the first DB 211, and transmits the sensing data to the first DB 211. Each EMS 320 may transmit an error code to the first DB 211 when an error occurs in the equipment 320.

In step S12, the equipment management apparatus 200 updates the equipment information, which is stored in the first DB 211, based on the sensing data. The equipment management apparatus 200 may update the equipment information, which is stored in the first DB 211, based on the error code. The equipment management apparatus 200 automatically generates the index information, which can associates the equipment information with the user information.

In step S13, the contractor terminal 400 responds to the maintenance of the equipment 310, accesses the second DB 212, and transmits the maintenance information to the second DB 212.

In step S14, the equipment management apparatus 200 updates the equipment information stored in the first DB 211 based on the maintenance information. The equipment management apparatus 200 automatically generates index information associated with the equipment information and the user information. The index information is stored in the first DB 211 and the second DB 212.

In the sequence illustrated in FIG. 5, the processing of steps S11 to S14 is repeatedly performed. That is, the equipment information stored in the first DB 211 is updated in response to receiving the sensing data, the error code, or the maintenance information.

Under these assumptions, if requested by a third party, the equipment management apparatus 200 may provide the equipment information to a third party as illustrated in step S15. In such a case, the equipment management apparatus 200 deletes at least the index information.

As mentioned above, access of the EMS 320 or the contractor terminal 400 to the first DB 211 is permitted, but access of the EMS 320 or the contractor terminal 400 to the second DB 212 is prohibited. Therefore, the equipment management apparatus 200 transmits the access rejection to the second DB 212 to the EMS 320 as illustrated in step S17A even if it receives the access request to the second DB 212 from the EMS 320 as illustrated in step S16A.

(Function and Effect)

In the embodiment, the equipment management apparatus 200 is configured to prohibit even the EMS 320 or the contractor terminal 400 that is allowed to access the first DB 211 from accessing the second DB 212. According to such a configuration, leakage of the user information stored in the second DB 212 can be appropriately suppressed, and the user information can be appropriately protected.

OTHER EMBODIMENTS

The present invention has been described by the above described embodiment. However, the discussions and drawings forming part of this disclosure should not be construed to limit the present invention. According to this disclosure, various alternative embodiments, examples, and running techniques will be apparent to those skilled in the art.

In the embodiment, the first DB 211, and the second DB 212 are physically different databases. However, embodiments are not limited thereto. The first DB 211, and the second DB 212 may be formed by one database and virtually separated from one another by setting access authorities.

In the embodiment, the first DB 211, and the second DB 212, are provided in the equipment management apparatus 200. However, embodiments are not limited thereto. At least any one of the first DB 211, and the second DB 212 may be provided in a server connected to the equipment management apparatus 200 via the network 120.

Although it is not particularly mentioned in the embodiment, the functions of the equipment management apparatus 200 may be provided by a cloud service.

In the embodiment, a control apparatus which controls the equipment 310 is the EMS 320. However, embodiments are not limited thereto. The control apparatus may be the equipment 310 per se. The control apparatus may be a remote controller, which transmits control commands to the equipment 310.

It is not particularly mentioned in the embodiment, the equipment management apparatus 200 (controller 230) may set, for each entity which accesses the equipment information, the access authority of information elements included in the equipment information. For example, the equipment management apparatus 200 may allow the EMS 320 to access the sensing data and prohibit the contractor terminal 400 from accessing the sensing data. Alternatively, the equipment management apparatus 200 may allow the contractor terminal 400 to access the operation history and prohibit the EMS 320 from accessing the statistical data.

In the embodiment, the entities which access the equipment information are the EMS 320 and the contractor terminal 400. However, embodiments are not limited thereto. The entity may be a user terminal belonging to a user of the equipment 310. In such a case, the equipment management apparatus 200 may allow the user terminal to access the operation history and prohibit the user terminal from accessing the sensing data.

Although it is not particularly mentioned in the embodiment, the equipment information may include basic information such as installation date, predetermined durable years, and rated power consumption.

Note that the entire contents of Japanese Patent Application No. 2017-187647 filed on Sep. 28, 2017 are incorporated by reference herein.

The invention claimed is:

1. An equipment management system comprising:
a first database configured to store equipment information about an equipment;
a second database configured to store user information about a user; and
a controller configured to collect the equipment information from a control apparatus controlling the equipment,
wherein
the controller is configured to allow access to the first database from the control apparatus,
the controller is configured to prohibit access to the second database from the control apparatus,
the first database and the second database store index information associating the equipment information and the user information, and
the controller is configured to delete at least the index information when providing the equipment information to a third party.

2. The equipment management system according to claim 1, wherein the first database and the second database are physically different databases.

3. The equipment management system according to claim 1, wherein the equipment information includes at least one of: sensing data including numerical data representing an operation state of the equipment; an error code identifying an error of the equipment; statistical data obtained by a statistical process of the numerical data; reference data including a threshold value compared with the numerical data; or an operation history of the equipment.

4. The equipment management system according to claim 1, wherein the controller is configured to set an access authority of an information element included in the equipment information for each entity which accesses the equipment information.

5. An equipment management method, comprising:
storing, in a first database, equipment information about an equipment;
storing, in a second database, user information about a user;
collecting the equipment information from a control apparatus controlling the equipment;
allowing access to the first database from the control apparatus; and
prohibiting access to the second database from the control apparatus,
wherein
the first database and the second database store index information associating the equipment information and the user information, and
the equipment management method further comprises deleting at least the index information when providing the equipment information to a third party.

* * * * *